Patented Oct. 15, 1929

1,732,124

UNITED STATES PATENT OFFICE

CHARLES E. FAWKES, OF CHICAGO, ILLINOIS, ASSIGNOR TO THE QUAKER OATS COMPANY, OF CHICAGO, ILLINOIS, A CORPORATION OF NEW JERSEY

COLORED MATERIAL AND COATING AND PROCESS FOR PRODUCING THE SAME

No Drawing. Application filed May 11, 1925. Serial No. 29,572.

This invention relates to colored materials and coating and processes for producing the same in order that such materials may be colored or such coatings may be applied to various surfaces, such as those of metal, wood and the like to provide a covering having a desirable appearance.

More particularly my present invention pertains to colored materials and coatings, and processes for producing color in situ within or upon such materials and coatings, such as wood, metal, molded products and fabricated articles, as well as in enamels, veneers, lacquers and the like.

My invention in one of its phases relates particularly to coatings of the general type commonly known as lacquers. The lacquer herein referred to may, if desired, be made up as a solution of nitro-cellulose, cellulose acetate, or cellulose ethers, or the like, in certain well-known solvents, such as ethyl acetate, butyl acetate, amyl acetate, acetone, or the like, diluted, in many instances, by the addition of one or more of the common diluents, such as butyl alcohol, toluol, benzol, alcohol, and the like. One or more plasticizers may be added to the solution, such as castor oil, tricresyl phosphate, butyl tartrate, and the like, with or without the addition of certain gums such as shellac, copal, and the like.

It has heretofore been the practice in this art to impart color to such lacquers when used as coatings in much the same way that color is imparted to preparations of paints and varnish stains, by the addition of the solution of a suitable pigment or other coloring material or by dyeing the solution with a dye soluble in the solvent and capable of remaining dispersed in the film or coating after the solvent has evaporated. These methods of the prior art cause the coating so produced to appear less glossy when dried out than a similar coating not containing pigments or dyes or other coloring agents. Where a glossy coating has been desired, it has heretofore been the practice to treat the lacquer solution to disperse the color imparting agent within the interstices of the solution and to use a minimum quantity of coloring agent and then grind the mixture for a very long period in a pebble mill. It is often found that this grinding operation must be continued for one hundred hours or more in order to obtain the proper luster to or appearance in the coating, and where a very glossy appearance is desired, it is usually necessary to apply over the surface of the colored coating, a clear undyed and unpigmented lacquer to obtain a sufficiently high luster.

The present invention in one of its aspects provides a new method for producing colored materials and coatings, as well as new lacquers and the like, having a high luster, without the addition of dyes, pigments or other agents of the character heretofore used and without necessarily using any top or finish coating to provide the luster. By the present invention, a black coating may be produced with a nitro-cellulose or other suitable base, with a resulting very high luster equaling or approximating in specular reflecting power a clear undyed and unpigmented lacquer. My improved coating material is uniform in quality and requires no grinding in its fabrication. The improved coating material in its initial state and before being applied is clear and transparent when first prepared or made up and remains quite clear even after standing for a time. The color is not imparted to the coating or material after the same has been applied or mixed until substantial portions of the volatile solvents of the coating or material have evaporated from the coated surface or from the material to be colored. The coating or material then turns a jet-black color. The color is uniform in quality and the distribution of it is permanent. As regards lacquer, its viscosity is not substantially affected by my present process and the resulting coating possesses many of the desirable physical properties of the usual nitro-cellulose coating having similar characteristics.

In practicing the present invention to secure a black glossy appearance, the material or solution to be colored is provided with a substance or substances which will react chemically when the material or coating reaches a proper stage of dryness in order to produce a black coloring in situ. For this purpose, I prefer to use furyl alcohol and another agent which may be an acid or a substance capable of providing a reaction similar to that of acid, such as a substance that hydrolyzes in solution which agent, as I will designate it herein as an acid agent, will react with the furyl alcohol, the latter remaining after most of the other volatile constituents of the solution or mixture have evaporated. The acid agents which will accomplish this desirable reaction with furyl alcohol are numerous and among those which have been successively employed for that purpose are sulphuric acid, hydrochloric acid, and bodies such as di-ethyl sulphate, benzene sulphonic acid, or zinc chloride or ferric chloride in alcohol solution, as examples. The aforesaid acid agent reacts with the furyl alcohol to produce a new substance of black color which does not in any substantial measure affect the glossiness or luster of the external surface of the coating or material that is colored.

The furyl alcohol and the acid agent which react with each other to produce the color in the coating or material during the process of drying, are preferably added to the solution when made up.

The lacquer solution which may comprise a cellulose base, such as nitro-cellulose, and a solvent, such as ethyl acetate, or the like, with or without a diluent, such as butyl alcohol, together with a plasticizer, such as castor oil and the like, is made up in the usual manner, as heretofore indicated, with or without certain gums such as shellac and the like, and to this solution there may be added suitable quantities of furyl alcohol and an acid agent, such as sulphuric acid.

The proportions of the furyl alcohol and the acid agent are capable of being varied widely, provided sufficient acid is added to react with the furyl alcohol used. Nevertheless it is advisable to have the furyl alcohol and acid agent present in such quantities that the free acid present in the finished coating or product will be a minimum or present only in harmless quantities. It has been found, however, that a satisfactory and economical proportion of furyl alcohol is between 1 per cent and 2 per cent by weight of the solution. However, furyl alcohol may be used in excess of this amount, even in quantities of 10 per cent to 20 per cent, depending on the coloring power that is desired to be obtained. The amount of the acid substance which is required to effect a proper blackening of the coating depends upon the amount of furyl alcohol used and also upon the acidity of the acid substance, and to some extent, upon its volatility. Thus, if the acid used is hydrochloric acid, a large part of it evaporates along with the solvents and diluents of the lacquer solution, leaving a less proportion of the acid agent present to react subsequently with the furyl alcohol, while if an acid with a low vapor pressure, such as sulphuric acid, is employed, practically none of it is lost and, therefore, substantially all of it remains for reaction with the furyl alcohol to produce the black or colored quality of the final coating or material. When the furyl alcohol is employed in the preferred proportions mentioned above, it has been found that relatively a very small quantity of acid may be employed. For example, if one per cent by weight of furyl alcohol is added to the solution, the amount of sulphuric acid to be employed preferably bears the proportion of one-tenth of one per cent by weight relative to the weight of the remainder of the solution. With these proportions a desirable black coating for some purposes may be economically produced.

It will be apparent that by means of my invention there has been provided a method for securing a glossy or lustrous colored coating without the necessity of adding dyes, pigments or other coloring agents of the types heretofore used and, hence, without the employment of a grinding operation during the process of manufacture. The colored coating which develops during my process of application and drying possesses great permanence and stability without deterioration of quality.

In using my present process in connection with other materials, such as molded products, fabricated articles, enamels, veneers and the like, it is necessary only to add the furyl alcohol at such point in the process of manufacture that the furyl alcohol will be subjected to suitable reaction conditions with an acid agent, as mentioned above, which will result in the formation of the desired color.

From the foregoing it will be obvious that my method for producing black coloring is applicable to a very wide range of materials, such as phenolic condensation products, shellac, resins, spirit or oil varnishes, asphalts, patent leather, artificial leather, shade cloth, and the like.

While I have herein described my invention and one process for practicing the same it is to be understood that I desire to have only those limitations imposed upon it as are set forth in the appended claims.

Having thus described my invention, what I claim as new and desire to secure by Letters Patent of the U. S. is:

1. The process for coloring materials which consists in treating them with furyl alcohol and a reaction agent therefor that results in the formation in situ of a black color.

2. The process for producing a colored coating for an article which consists in applying to the article a substance that comprises furyl alcohol and an acid agent, and then allowing the furyl alcohol to react to impart a black color to said coating.

3. The process for coloring materials which consists in treating them with furyl alcohol, and then causing the furyl alcohol to react in situ.

4. The process for coloring materials which comprises treating them with furyl alcohol, and then allowing the furyl alcohol to react in the presence of an acid agent to produce a black color in situ.

5. The process for imparting a black color to materials which consists in treating them with a substance comprising furyl alcohol and an acid, and then allowing the furyl alcohol to react thereby producing a black color in situ.

6. The process for producing a colored coating which consists in adding to a coating solution a quantity of furyl alcohol and an acid yielding substance that causes the furyl alcohol to react to produce a black color to said coating.

7. The process for imparting black color in situ to a coating which consists in adding to a coating solution a quantity of furyl alcohol and an acid yielding substance that hydrolyzes in solution and which causes the furyl alcohol to react during the process of drying to impart a black color to the coating.

8. The process of producing a colored coating which consists in adding to a lacquer coating solution a quantity of furyl alcohol and a quantity of an acid substance which causes the furyl alcohol to react in situ after the solution has been applied and thereby to impart a black color to said coating.

9. The process of producing a potentially black coating substance which comprises adding to a coating solution furyl alcohol and a catalyst which will cause the furyl alcohol to react to produce a black color.

10. The process of producing a potentially black coating substance which comprises adding furyl alcohol to an acid solution having protective coating properties and which solution will cause the furyl alcohol to react to produce a black color.

11. An article of manufacture colored by a reaction product of furyl alcohol, said reaction product being formed in situ.

12. An article of manufacture that is colored by a reaction product formed in situ from furyl alcohol and an acid substance.

13. A coating solution comprising furyl alcohol and a substance possessing acid properties.

14. A coating material comprising furyl alcohol and an acid yielding substance that reacts therewith to impart a black color to said coating substance.

15. A composition of matter for use as a protective coating comprising a lacquer solution, furyl alcohol, and a substance possessing acid products.

16. A composition of matter for use as a protective coating comprising a lacquer solution, furyl alcohol, and an acid yielding substance which reacts with said furyl alcohol to impart a black color to the composition.

17. A composition of matter comprising a soluble cellulose-derived base, a solvent, a plasticizer, furyl alcohol, and an acid substance.

18. A composition of matter for use as a coating which comprises a soluble cellulose-derived base, a solvent, a diluent, a plasticizer, a gum, furyl alcohol, and an acid substance.

In witness whereof, I have hereunto subscribed my name.

CHARLES E. FAWKES.

CERTIFICATE OF CORRECTION.

Patent No. 1,732,124.  Granted October 15, 1929, to

CHARLES E. FAWKES.

It is hereby certified that error appears in the above numbered patent requiring correction as follows: In the grant, and in the heading to the specification, title of invention, should read "Colored Materials and Coatings and Processes for Producing the Same" instead of "Colored Material and Coating and Process for Producing the Same"; page 1, line 2, for the word "coating" read "coatings"; page 2, line 14, for the word "successively" read "successfully"; and that the said Letters Patent should be read with these corrections therein that the same may conform to the record of the case in the Patent Office.

Signed and sealed this 7th day of January, A. D. 1930.

(Seal)

M. J. Moore,
Acting Commissioner of Patents.